United States Patent
Desai et al.

(10) Patent No.: US 11,393,354 B2
(45) Date of Patent: Jul. 19, 2022

(54) SYSTEM AND METHOD FOR GENERATING AN ASSESSMENT PAPER AND MEASURING THE QUALITY THEREOF

(71) Applicant: INDIAVIDUAL LEARNING PRIVATE LIMITED, Karnataka (IN)

(72) Inventors: Nishit Desai, Bangalore (IN); Keyur Faldu, Bangalore (IN); Achint Thomas, Bangalore (IN); Aditi Avasthi, Bangalore (IN)

(73) Assignee: INDIAVIDUAL LEARNING PRIVATE LIMITED, Bangalore (IN)

( * ) Notice: Subject to any disclaimer, the term of this patent is extended or adjusted under 35 U.S.C. 154(b) by 238 days.

(21) Appl. No.: 16/684,434

(22) Filed: Nov. 14, 2019

(65) Prior Publication Data
US 2020/0312179 A1 Oct. 1, 2020

(30) Foreign Application Priority Data
Mar. 28, 2019 (IN) .............................. 201941012257

(51) Int. Cl.
*G09B 7/08* (2006.01)
*G09B 5/02* (2006.01)
*G09B 5/14* (2006.01)

(52) U.S. Cl.
CPC .................. *G09B 7/08* (2013.01); *G09B 5/02* (2013.01); *G09B 5/14* (2013.01)

(58) Field of Classification Search
CPC ............... G09B 7/08; G09B 5/02; G09B 5/14
See application file for complete search history.

(56) References Cited

U.S. PATENT DOCUMENTS

| 2006/0121432 A1 | 6/2006 | Sun |
| 2010/0255453 A1 | 10/2010 | Chinearini |
| 2011/0217685 A1* | 9/2011 | Srinivasan ............... G09B 7/00 434/323 |
| 2013/0084554 A1 | 4/2013 | Shah et al. |
| 2014/0189829 A1* | 7/2014 | McLachlan ............. H04L 63/08 726/6 |
| 2015/0187225 A1* | 7/2015 | Worsley ................... G09B 7/07 434/178 |
| 2015/0356181 A1* | 12/2015 | Dettman ............. G06F 16/9535 707/728 |
| 2015/0371137 A1* | 12/2015 | Giffels ................ G06F 16/3329 706/46 |

(Continued)

*Primary Examiner* — Justin S Lee
(74) *Attorney, Agent, or Firm* — Maschoff Brennan

(57) ABSTRACT

A system and a method for generating a question paper are disclosed. Also disclosed is a method and a system for measuring the quality of a question paper. In one embodiment, the method for generating the question paper comprises, a) analysing reference question paper(s) b) generating a template comprising characteristic(s) for the question paper to be generated, and c) generating the question paper by selecting question(s) from a database so as to match the characteristic(s) of the template. Further, the characteristics of any given question paper or the generated question paper are compared with the characteristics in the generated template to determine a quality score. A system for implementing the disclosed methods is also disclosed. Further, a method for measuring effectiveness of a quality score and a method for interpreting a determined quality score is disclosed.

7 Claims, 7 Drawing Sheets

(56) References Cited

U.S. PATENT DOCUMENTS

| | | | | |
|---|---|---|---|---|
| 2016/0098634 A1* | 4/2016 | Allen | .................... | G06F 12/084 706/46 |
| 2016/0147875 A1* | 5/2016 | Adderly | .................. | G06F 40/30 707/726 |
| 2016/0148093 A1* | 5/2016 | Adderly | .................. | G06N 5/022 706/46 |
| 2018/0005293 A1* | 1/2018 | Adams | .............. | G06F 16/90335 |
| 2018/0357282 A1* | 12/2018 | Ambartsumov | .. | G06F 16/90335 |
| 2019/0066696 A1* | 2/2019 | Mu | ........................ | G10L 17/22 |
| 2019/0115104 A1* | 4/2019 | Uske | ....................... | G06F 3/167 |
| 2019/0205769 A1* | 7/2019 | Xie | ........................ | G06F 40/30 |
| 2019/0311029 A1* | 10/2019 | Kulshrestha | ............ | G06F 16/33 |

\* cited by examiner

SYSTEM AND METHOD FOR GENERATING AN ASSESSMENT PAPER AND MEASURING THE QUALITY THEREOF

PRIORITY STATEMENT

The present application hereby claims priority to Indian patent application number "201941012257" filed on Mar. 28, 2019, the entire content of which are hereby incorporated herein by reference.

TECHNICAL FIELD

The present disclosure generally relates to data analytics and content packaging, and more particularly to a system and method for generating an assessment paper and measuring the quality thereof.

BACKGROUND

Education is a process of facilitating learning, or acquisition of cognitive skills, knowledge, values, beliefs and habits, and has evolved since ancient times when the teacher and the students used to live together, and the students were taught philosophy, science, arts, administration and other techniques. Typically, it is desirable to educate individual students with different education programs adapted to the respective students. For this purpose, a lot of human resources must be concentrated on the preparation of many different teaching materials, training materials and programs, assessment materials, etc.

Typically, a test or an examination in an education process is an assessment intended to measure a test taker's (student's) knowledge, skill, aptitude, etc. and generally categorized into standardised tests and non-standardised tests. The standardised tests, often used in education and professional certification, are developed, administered and scored in a consistent manner. On the other hand, the non-standardised tests, often developed by individual instructors, are used to determine proficiency level of the students, to motivate the students to study, to measure the students' progress in achieving their goal and to provide feedback to the students. However, in many instances, the non-standardized tests are developed to resemble the standardized tests in scope, format, and difficulty for the purpose of preparing the students. Irrespective of category of tests, an instructor or an institute needs to generate lots of test papers in a given academic year to determine proficiency level of the students, to motivate the students to study, to measure the students' progress in achieving their goal and to provide feedback to the students.

On the other hand, students often wish to test themselves before they appear for an actual assessment test, using a variety of practice or simulated assessment tests. Such tests usually help the students with building familiarity with the test atmosphere and practicing proper time management, assessing preparedness with the subject matter/syllabus for the formal test, obtaining an idea of possible test results and measuring progress in all aspects of the test syllabus. One possible approach that may be followed is to attempt the earlier year assessment papers in a controlled scenario and predict the future performance based on the same. However, in many scenarios number of earlier assessment tests available may not be sufficient and students may require practicing more tests. Nonetheless, as the same questions are unlikely to repeat in the subsequent assessments, it becomes more important to understand the pattern of the questions listed in the earlier assessment papers, and to attempt more number of assessment papers.

However, in today's education system, the student-to-teacher (instructor) ratio is highly disproportionate and teachers spend a lot of time to generate test papers/assessment papers rather than focusing on teaching. The teachers use their expertise to generate an assessment paper that resembles the actual assessment paper. Besides, if multiple teachers create multiple assessment papers, it may suffer from individual biases of a given teacher. There's no standardized way to compare two assessment papers to check how similar or dissimilar they are in their current form. Moreover, to ensure practice assessment paper resemble the actual assessment papers as closely as possible and all students stand on even footing, parameters such as the difficulty level, ideal time for answering questions, distribution of questions over a given syllabus, and other various parameters of the assessment papers need to be carefully calibrated. However, tests generated manually based on the experience of one or more teachers may suffer from a drop in quality since the work product of the teachers is likely to be inconsistent over time, causing the pattern of the examination to fluctuate.

Advancements in information technology have led to the development of fast and secure computing systems for use as semi-automated content packaging systems which may be used for generating assessment papers. Such conventional systems and approaches are proven to be advantageous over the conventional method of manually generating assessment tests, in that the computerized test preparation systems and software offer faster test generation capabilities. One such system collects numerous questions in a database and generates an assessment test by selecting some of the questions from the database. Unfortunately, such an approach generally involves random selection of questions resulting in assessment tests which often fail to cover important aspects of the syllabus as done in an actual or earlier paper or focus too narrowly on a particular area thereof. Few advanced systems and software require subject matter experts or teachers intervention for generating the tests. For example, the conventional systems require at least a test template as input, which is typically produced by the teachers, from which a plurality of similar, unique question variants are produced using a question database. In other words, a teacher needs to input various parameters such as number of questions, question variables, question constraints, etc. using a user interface and the system receives such data (template) for generating the assessment papers. However, even such systems require subject matter experts or teachers input, the teachers needs to consider and input all the parameters for a given assessment test, and hence time consuming. Further, as the templates are generated by the teachers and if multiple teachers create multiple templates, the generated assessment test paper may suffer from individual biases of a given teacher. Moreover, there is no standardized way to compare two assessment papers to check how similar or dissimilar they are in their current form.

SUMMARY OF THE INVENTION

A system and method for generating an assessment paper and measuring the quality of an assessment paper is disclosed. In one embodiment, the method comprises, retrieving a value of each of a plurality of attributes associated with each question in one or more reference set of learning assessment questions, generating a template for the set of learning assessment questions based on the retrieved values of the plurality of attributes, and selecting questions from a database of questions based on the generated template for generating the set of learning assessment questions. In one embodiment of the present disclosure, generating the template for the set of learning assessment questions comprises, determining one or more characteristics representative of the one or more reference sets of learning assessment questions based on the values of each attribute associated with each question from the reference set of learning assessment questions, and generating a set of characteristics of the set of learning assessment questions representative of the one or more reference set of assessment questions.

A method for assigning a score to a set of learning assessment questions based on one or more reference set of assessment questions comprises the steps of, retrieving a value of each of a plurality of attributes associated with each question in the one or more reference set of learning assessment questions, determining one or more characteristics representative of the one or more reference sets of learning assessment questions based on the values of each attribute associated with each question from the reference set of learning assessment questions, retrieving a value of each of a plurality of attributes associated with each question in the set of learning assessment questions, determining one or more characteristics representative of the set of learning assessment questions based on the values of each attribute associated with each question from the set of learning assessment questions, and comparing each determined characteristic representative of the set of learning assessment questions with the retrieved characteristics representative of the one or more reference sets of learning assessment questions and assigning a quality score to the set of learning assessment questions.

Further, a method for measuring effectiveness of a quality score being determined for a question paper is disclosed, wherein the method comprises, comparing attempts data associated with the question paper and attempts data associated with one or more reference question paper for determining one or more empirical validation parameters, and recording, the quality score and the one or more empirical validation parameters associated with the quality score, for providing interpretations for a quality score being determined for any given question paper. Furthermore, a method for interpreting a determined quality score is disclosed.

BRIEF DESCRIPTION OF THE FIGURES

The disclosed system and method will be described and explained with additional specificity and detail with the accompanying figures in which.

Figure 1:
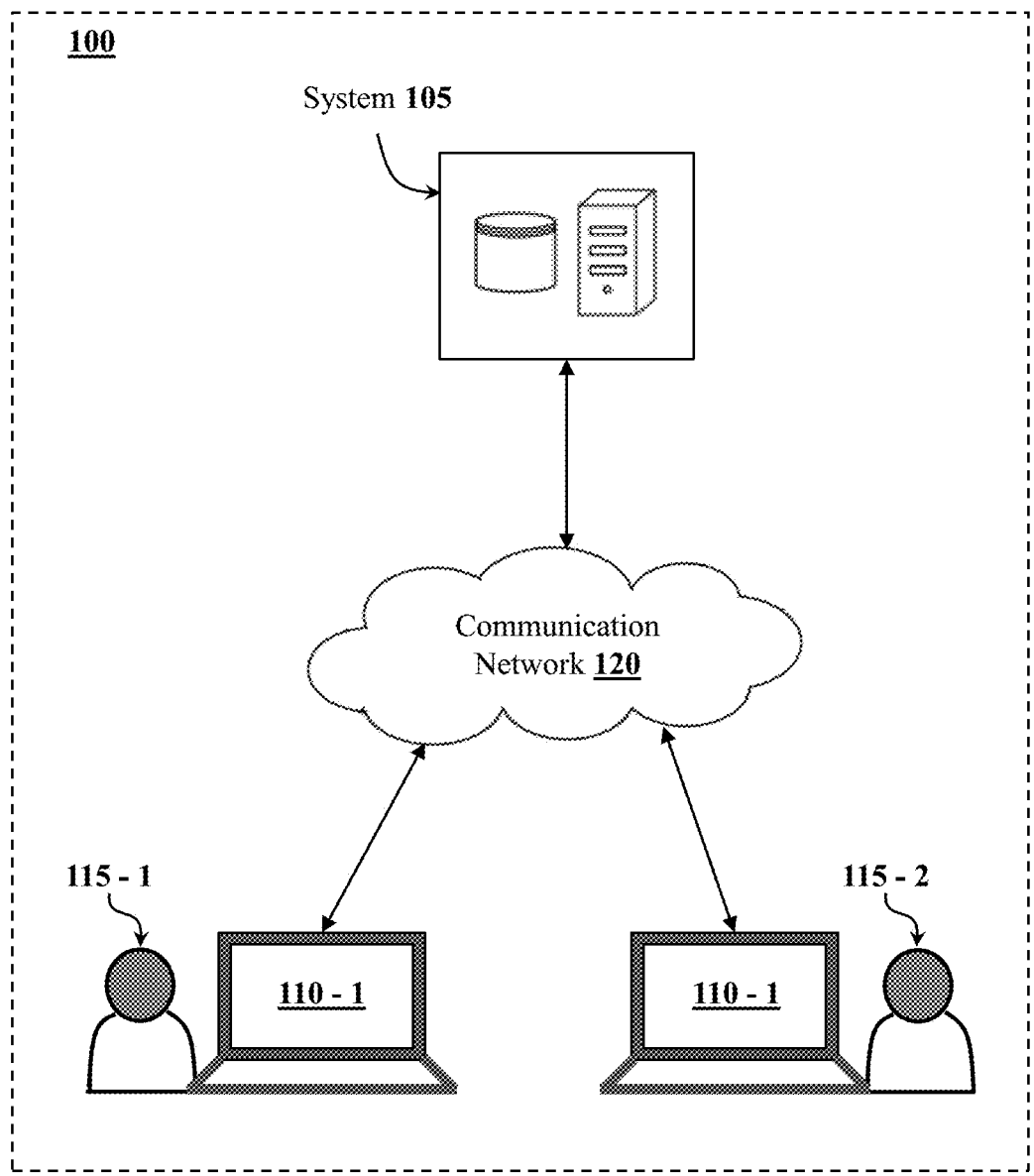
FIG. 1 illustrates an exemplary network environment 100 implementing a system for generating a set of learning assessment questions in accordance with an embodiment of the present disclosure.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION OF THE EXEMPLARY EMBODIMENTS

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying figures.

Embodiments of the present disclosure discloses a system and method for generating a set of learning assessment questions using a template and a question database, wherein the template is generated by analysing the values of a plurality of attributes of one or more reference set of learning assessment questions.

The term "a set of learning assessment questions" as described herein refers to "a set of questions" or "a question paper" which may be used for education and professional certification, to determine proficiency level of students, to motivate students to study, to measure the students' progress in achieving their goal and to provide feedback to the students. The same may be used by the students for learning, practising, preparation, and to determine proficiency level, etc.

Further, the term "one or more reference set of learning assessment questions" as described herein refers to "one or more set of questions appeared in one or more earlier tests" or "one or more earlier question papers" or "one or more question papers generated by individuals or institutions" or any collection of question papers". Furthermore, the term "plurality of attributes" as described herein refers to but not limited to difficulty level, ideal time, chapter identifier, concept level, bloom level, learning slope, one or more lexical features, one or more cognitive features, guessing factors, etc. The plurality of attributes and the value(s) of each of the plurality of attributes of a given set of learning assessment questions (question paper) define "one or more characteristics (pattern)" of the set of learning assessment questions (question paper).

Now referring to said terms, the present disclosure discloses a system and method for generating a question paper using a template and a question database, wherein the template is generated by analysing the values of a plurality of attributes of one or more reference question papers. In other words, one or more characteristics of the one or more reference questions papers are determined and analysed, and a template for a question paper (the question paper to be generated) is generated, wherein the template defines one or more characteristics of the question paper to be generated. Then, based on the generated template, one or more questions are selected from the question database for generating the question paper.

FIG. 1 illustrates an exemplary network environment 100 implementing a system for generating a set of learning assessment questions in accordance with an embodiment of the present disclosure. As shown, the network environment 100 comprises a system 105 configured for generating the set of learning assessment questions (a question paper), a plurality of user devices 110-1 and 110-2 (shown only two user devices and hereafter referred as user device 110) associated with a plurality of users 115-1 and 115-2, and a communication network 120, wherein the system 105 and the plurality of user devices 110-1 and 110-2 are communicatively connected via the communication network 120.

The system 105 for generating set of learning assessment questions (the question paper) may include, for example, a mainframe computer, a computer server or a network of computers or a virtual server which provides functionalities or services for other programs or devices such as for the user device 110. In one implementation, the system 105 is a cloud server comprising one or more processors, associated processing modules, interfaces and storage devices communicatively interconnected to one another through one or more communication means for communicating information. The storage associated with the system 105 may include volatile and non-volatile memory devices for storing information and instructions to be executed by the one or more processors and for storing temporary variables or other intermediate information during processing. In one embodiment of the present disclosure, the system 105 is configured for retrieving a value of each of a plurality of attributes associated with each question in one or more reference set of learning assessment questions (reference question papers), generating a template for the set of learning assessment questions based on the retrieved values of the plurality of attributes, and selecting questions from a database of questions based on the generated template for generating the set of learning assessment questions. The manner in which the system 105 performs one or more said functions is described in detail further below in the present disclosure. Hereinafter, the term "set of learning assessment questions" or "assessment paper" is referred to as "question paper" (the question paper to be generated), and the term "set of one or more reference learning assessment questions" is referred as "one or more reference question papers".

The user device 110 may be any computing device that often accompanies their users 115 to perform various activities and by way of example, the user device 110 may include but no limited to a computer, a laptop, a notebook computer, a tablet, and a smartphone, having communication capabilities. The user device 110 may communicate with the system 105 through the communication network 120 in one or more ways such as wired, wireless connections or a combination thereof. It will be appreciated by those skilled in the art that the user device 110 comprises one or more functional elements capable of communicating through the communication network 120 to receive one or more services offered by the system 105. In one embodiment of the present disclosure, a user (an instructor or a teacher or a student) may register with the system 105 for generating the question paper. It is to be noted that the user may register with the system 105 using a dedicated web interface or an application by providing necessary credentials, for example, a user name, password, contact details, payment details, and the like. Upon successful one time registration, the user may use the system 105 for generating the one or more sets of learning assessment questions, that is, the one or more question papers. It is to be noted that an unregistered user may also use the system 105 for generating the one or more question papers. However, the registration process only enables the users to input their personal information and hence to create a user profile. In one implementation, the user may install the application which provides an interface for selecting one or more reference question papers and for triggering the automated test generation process. The manner in which the user may trigger the automated test generation process is described in detail further below.

The communication network 120 may be a wireless network or a wired network or a combination thereof. Wireless network may include long range wireless radio, wireless personal area network (WPAN), wireless local area network (WLAN), mobile data communications such as 3G, 4G or any other similar technologies. The communication network 120 may be implemented as one of the different types of networks, such as intranet, local area network (LAN), wide area network (WAN), the internet, and the like. The communication network 120 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Further the communication network 120 may include a variety of network devices, including routers, bridges, servers, modems, computing devices, storage devices, and the like. In one implementation, the communication network 120 is internet which enables communication between the system 105 and the plurality of user devices 110.

Figure 2:
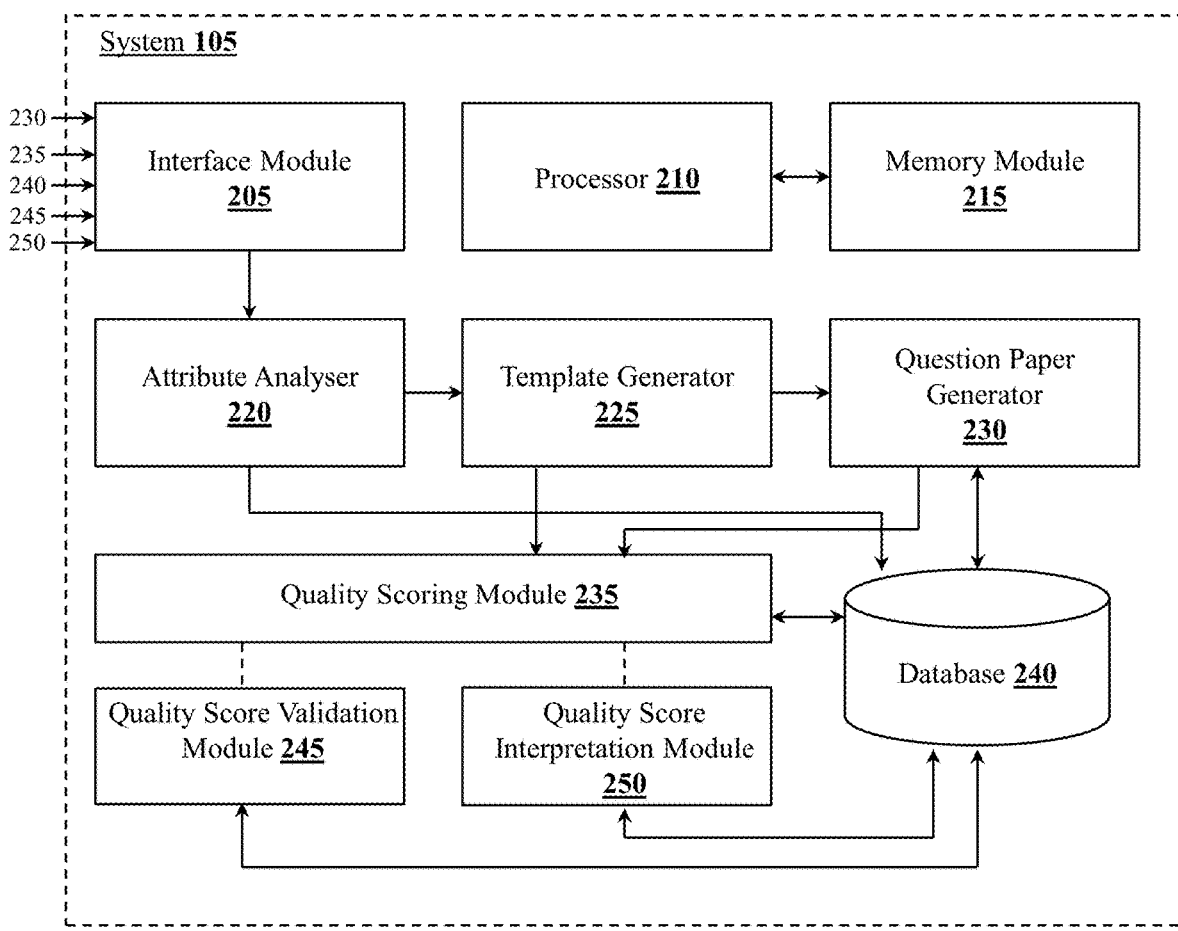
FIG. 2 is a block diagram of an exemplary recommendation server 105 in accordance with an embodiment of the present disclosure.

As described, the system 105 is configured for generating the question paper by analysing the one or more characteristics of the one or more reference question papers. FIG. 2 is a block diagram of the system 105 in accordance with an embodiment of the present disclosure. As shown, the system 105 comprises an interface module 205, one or more processor(s) 210, a memory module 215 coupled to the processor 210, an attribute analyser 220, a template generator 225, a question paper generator 230, a quality scoring module 235 and a database 240.

The interface module 205 may include a variety of hardware and software elements, such as interface for input/output devices, external memory devices, printers, etc. and network interface elements enabling communication between the system 105 and the user devices 110, and between the system 105 and webservers and external databases in the communication network 120.

As described, the memory module 210 may include volatile and non-volatile memory devices for storing information and instructions to be executed by the one or more processors 210 and for storing temporary variables or other intermediate information during processing. In one implementation, the various other modules such as attribute analyser 220, the template generator 225 and the quality scoring module 235 may be implemented as software modules within the memory module 210.

In one embodiment of the present disclosure, the database 240 is stored with the one or more reference set of learning assessment questions (one or more reference question papers), wherein each reference question paper may represents one of an earlier year question paper, question paper generated by individuals or institutions, or any question paper. In other words, the database 240 is stored with a plurality of earlier year question papers or a plurality of previously generated question papers or both, and hence referred as "reference question paper(s)". Further, the database 240 is stored with a plurality of attributes associated with each question in the one or more reference question papers and value(s) associated with each of the plurality of attributes. In one implementation, the one or more reference question papers, the plurality of attributes and the values associated with each question in the one or more reference question papers (may be referred as metadata) are uploaded manually. In a preferred implementation, dedicated tools are used for scanning the earlier question papers and uploading the one or more questions in each of the earlier question papers as reference set of learning assessment questions and associated metadata to the database 240. It is to be noted that the one or more reference question papers and the metadata (attributes and values) associated with the same are stored in different categories (JEE question papers, GMAT question papers, etc.) and in a suitable manner in the database 240. In one example, JEE earlier years question papers (year 2014, 2015, 2016, 2017, 2018 and 2019) are uploaded and stored in the database 240 along with the metadata, that is the plurality of attributes associated with each question in all the question papers and the values associated with each of the attributes. The plurality of attributes and the values associated with the plurality of attributes of each reference question paper are used for quantifying one or more questions in the reference question paper, and further for determining one or more characteristics representative of the one or more reference question papers. The plurality of attributes associated with one or more questions may include but not limited to question type, difficulty level, ideal time, chapter identifier, concepts, bloom level, learning slope, one or more lexical features, one or more cognitive features, guessing factor, etc. Below table "Table 1" lists exemplary attributes and description of the same.

TABLE 1

| Attributes | Description |
|---|---|
| Difficulty Level | A question may be assigned difficulty level of 1 to 10 with 1 indicating "Easy" and 10 indicating "Difficult". |
| Question Type | Single choice, multiple choice, matrix questions, numerical question, etc. |
| Ideal Time | Ideal time to solve a question is defined as time required by an achiever student to solve the given question. |
| Chapter ID | The chapter identifier for a given question. It's to be noted that chapter identifier may differ depending on the context of the exam the question belongs to. |
| Concepts | Concept knowledge required to solve a given question. These concepts are tied to knowledge graph. |
| Bloom Level | Bloom level of a question. Knowledge, Comprehension, Application, Analysis, Synthesis, and Evaluation. |
| Learning Slope | Learning slope may determine the difficulty of questions by achiever students versus the other students. This helps in identifying "tricky questions". |
| Lexical features | Length of a question, complexity of a question, inclusion of equations. |
| Cognitive Features | Inclusion of other cognitive capabilities such as a graph, a picture, etc. |
| Guessing Factor | Likelihood of a guess being the correct answer. |
| Behavioural features | Careless mistakes, Time spent on non-attempts, overtime correct answers, overtime incorrect answers etc. |

In addition to the one or more reference question papers, the database 240 is stored with plurality of questions and metadata, wherein the plurality of questions and the metadata may be collected from a plurality of text books, study materials, institutions, experts, etc., and updated in the database 240 as a question bank, for example. Hence, the database 240 may include a plurality of reference question papers, a plurality of questions from text books, study materials, institutions, experts, etc., along with the metadata. As described, the metadata refers to the one or more attributes and the value(s) of the one or more attributes associated with the question. For example, a question may have an attribute "Chapter ID" and the value may be "2" indicating "second chapter". Similarly, the same question may have other attributes and values such as "Question Type" with value "2" indicating multiple choice question, "Difficulty Level" with value "8", "Bloom Level" with value "2" indicating "Comprehension", etc., Hence, the metadata may be utilized to categorize the questions in the database 240.

Now referring to the Table 1, and considering a JEE question paper having "90" questions (a reference set of learning assessment questions), each question may have one or more attributes and values associated with it. For example, a question may have the attributes such as difficulty level of "6" and an ideal time of "3 minutes" Bloom Level "Application" and Question Type "Matrix Question" associated with it. In a preferred embodiment, values of all the attributes associated with all the questions in the one or more reference question papers are stored in the database 240. Further, in another embodiment of the present disclosure, besides the above mentioned academic attributes, the database 240 is stored with behavioural attributes associated with the reference question papers. For example, the one or more behavioural attributes may include, but not limited to, careless mistakes or wasted attempts, overtime incorrect attempts, overtime correct attempts, percentage time spent on non-attempts, etc. In one implementation, the one or more behavioural attributes are determined using activity data of the users (students) and the context of the activity. In other words, the users' interaction (activity data) while attempting the reference test (activity) are measured and analysed along with the context of the activity to determine the one or more behavioural attributes. Then, the behavioural attributes associated with the reference question paper is stored in the database 240 or linked with the database 240. The manner in which the behavioural attributes are determined is described in detail in Indian patent application numbered "201941012400" entitled "System and Method for Behavioural Analysis and Recommendations" filed on Mar. 29, 2019, the relevant content of which is incorporated herein by reference.

In one embodiment of the present disclosure, the question level attributes associated with all the questions in the one or more reference question papers are analysed and aggregated to determine the one or more characteristics representative of the one or more reference question papers. In another embodiment of the present disclosure, the attributes of questions and the behavioural attributes associated with the questions are analysed and aggregated to determine the one or more characteristics representative of the one or more reference question papers. The determined one or more characteristics are used for generating a set of characteristics (template), each characteristic having a value associated with it, which is used for generating the set of learning assessment questions (the question paper). The manner in which the system 105 functions to generate the question paper is described in detail further below.

Figure 3:
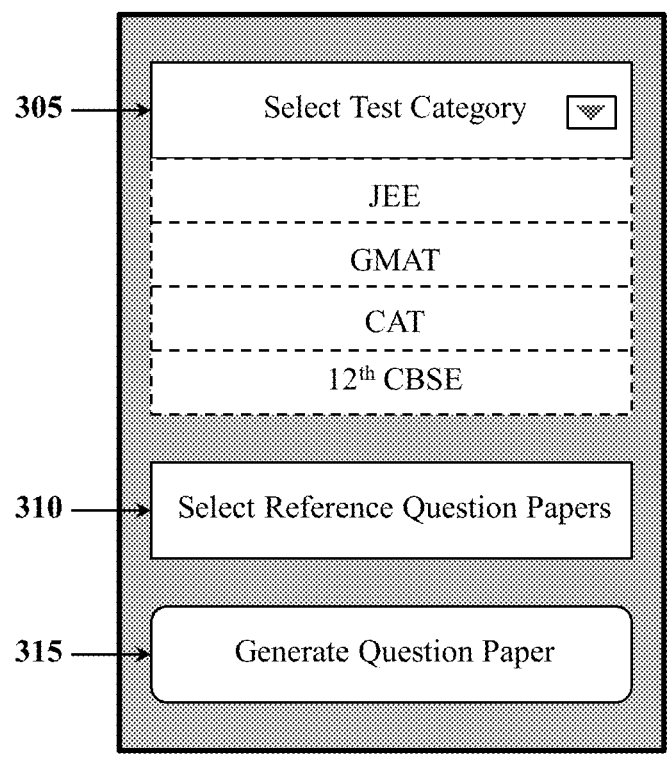
FIG. 3 illustrates an exemplary user interface for triggering the question paper generation process in accordance with an embodiment of the present disclosure.

As described, a user (a teacher or an instructor or a student) may use the system 105 for generating a question paper. In one implementation, the user may use the web interface or the application for triggering the question paper generation process. FIG. 3 illustrates an exemplary user interface for triggering the question paper generation process in accordance with an embodiment of the present disclosure. As shown, initially the user may select the category of the question paper to be generated using the "select test category" option 305, wherein the category may be one of JEE, GMAT, CAT, 12$^{th}$ standard CBSE, etc. Upon selecting a category, for example JEE, the user may select "generate question paper" option 315 for generating the question paper (JEE). In such a scenario, the system 105 selects one or more reference question papers from the database 240 and generates the JEE question paper. That is, in a preferred embodiment of the present disclosure, the system 105 selects all the reference question papers for generating the template, and hence for generating the question paper. Alternatively, the user may select one or more reference question papers for generating the question paper using the application. In such a scenario, the application redirects the user to a next interface where the user may select one or more reference question papers or may select all the reference question papers. Upon selecting, the user may submit the selection and the application generates a query for generating the question paper, wherein the query comprises the user ID or the user device ID, test category, reference question paper identifier(s), etc.

Referring back to FIG. 2, in one embodiment of the present disclosure, the attribute analyser 220 identifies the one or more attributes associated with each question in the one or more reference question papers and retrieves values (s) of each of the one or more attributes. That is, upon receiving the query from the user device, the attribute analyser 220 selects the one or more reference question papers from the database 240 and identifies the one or more attributes associated with each question in the one or more reference question papers and retrieves values(s) of each of the one or more attributes. As described in the present disclosure, considering one JEE reference question paper and one question from the JEE reference question paper, the attribute analyser 220 identifies the one or more attributes and the value(s) associated the question, for example, difficulty level of "7" and an ideal time of "5 minutes" for answering the question, etc. Similarly, the attribute analyser 220 identifies the one or more attributes associated with each question in the one or more JEE reference question papers and retrieves values(s) of each of the one or more attributes. In another example, considering three JEE reference question papers each having "90" questions, the attribute analyser 220 identifies the all the attributes associated with each question in all the three JEE reference question papers and retrieves values(s) of each of the attributes, and temporarily stores in the memory 215 associated with the system 105 for further processing.

In one embodiment of the present disclosure, the template generator 225 is configured for generating a template for the set of learning assessment questions (the question paper to be generated) based on the retrieved values of the plurality of attributes of the one or more reference question papers. In one embodiment of the present disclosure, the template generator 225 determines one or more characteristics representative of the one or more reference question papers based on the values of each attribute associated with each question from the one or more reference question papers, and generates a set of characteristics of the question paper that needs to be generated. The manner in which the template, comprising the set of characteristics for the question paper to be generated, is generated is described in detail further below.

As described, the template generator 225 initially determines the one or more characteristics representative of the one or more reference question papers based on the values of each attribute associated with each question from the one or more reference question papers. The exemplary characteristics of a reference question paper are listed below in Table 2.

TABLE 2

| Characteristics | Description |
| --- | --- |
| Average Difficulty Level and distribution of difficulty level | Average difficulty level of the reference question paper (which may be between level of 1 to 10 with 1 indicating "Easy" and 10 indicating "Difficult"). Distribution of difficulty level - Distribution of difficulty level of questions in the one or more reference question papers. |
| Average ideal time distribution of ideal time | Average ideal time to solve the reference question paper is defined as time required by an achiever student to solve the reference question paper. Distribution of ideal time - Distribution of ideal time in one or more reference question papers. |
| Chapter distribution of question | The weightage of various chapters in the one or more reference question papers. |
| Question type distribution | Ratio of different types of questions such as 50% single choice or descriptive answers, 25% multiple choice questions, 25% matrix questions, etc. |
| Concept distribution | The weightage of various concepts in the one or more reference question papers. |
| Bloom Level | Number of questions at the different bloom levels. (The bloom levels may be, for example, Knowledge, Comprehension, Application, Analysis, Synthesis, and Evaluation.) |
| Average learning slope of questions | Learning slope may determine the perceived difficulty of questions by achiever students versus the other students. This is different from difficulty level mentioned above as these questions may not necessarily be difficult but |

TABLE 2-continued

| Characteristics | Description |
| --- | --- |
| | they can be classified as "tricky" questions in the reference question paper. |
| Lexical features | Aggregation of various lexical features such as but not limited to length of the one or more reference question papers, the complexity of the one or more reference question papers, etc. |
| Behavioural features | Aggregation of various behavioural features such as Careless mistakes, Time spent on non-attempts, overtime correct answers, overtime incorrect answers etc. |

Referring to the Table 2, an exemplary characteristics "Average Difficulty Level" of the reference question paper may be determined by averaging the values of "difficulty level (an attribute)" of all the questions in the reference question paper. For example, considering a JEE reference question paper having "30" questions of difficulty level of "8", "30" questions of difficulty level of "7", "20" questions of difficulty level of "6", and "10" questions of difficulty level of "9", the template generator 225 computes the average difficulty as "7.5". In another example, the characteristic "Average Ideal Time" is determined by averaging the values associated with the question level attribute "Ideal time" of all the questions in the reference question paper. Similarly, other characteristics of the reference question paper are determined based on the values of one or more attributes associated with each question in the reference question paper. It is to be noted that various statistical analysis methods may be implemented for determining the one or more characteristics and the value(s) of the one or more characteristics of the reference question paper.

Similarly, the template generator 225 determines the one or more characteristics of all the reference question papers based on the values of each attribute associated with each question in the one or more reference question papers. For example, considering three JEE reference question papers for generating the question paper, the template generator 225 determines the one or more characteristics of all the three reference papers. Based on the one or more characteristics of the one or more reference question papers, the template generator 225 generates the set of characteristics of the question paper that needs to be generated. For example, considering three JEE reference question papers having "Average Difficulty Level" characteristics values "7", "8" and "8.5", the template generator 225 computes the average difficulty as "7.8", which should be the average difficulty level of the question paper that needs to be generated. Similarly, the template generator 225 determines the other characteristics of the question paper (that needs to be generated) based on the determined one or more characteristics representative of the one or more reference question papers, and generates the template (having the set of characteristics) for the question paper. As described, various statistical analysis methods may be implemented for determining the one or more characteristics of the question paper and hence for generating the template. Further, in one implementation, the behavioural attributes associated with the one or more reference question papers are analysed and aggregated to determine the one or more characteristics representative of the one or more reference question papers. For example, behavioural characteristics such as overtime incorrect attempts and overtime correct attempts in a given reference question paper are determined using the activity data of the users, and such characteristics are used during the generation of the question paper in order to calibrate the question paper. As described, the template is generated by determining the one or more characteristics representative of the one or more reference papers, wherein the one or more characteristics of the one or more reference question papers are determined based on the values of each attribute associated with each question in the one or more reference question paper. Hence, a template which determine a typical question paper looks like for a given exam comprises one or more characteristics such as but not limited to:

Total number of questions in the question paper.
Average difficulty and distribution of difficulty level of questions.
Average ideal time and distribution of ideal time of questions.
Chapter distribution of questions.
Question type distribution across question paper to be generated—for example, 50% ingle choice, 25% multiple choice questions, and 25% matrix questions.
Concept distribution across the question paper.
Length and complexity of one or more questions.
Aggregation of behavioural attributes In one embodiment of the present disclosure, the generated set of characteristics, having values, (template) of the set of learning assessment questions (the question paper to be generated), and the database 240 storing the plurality of questions and the metadata are used for generating the question paper. The manner in which the question paper is generated is described in detail further below.

Referring back to FIG. 2, the question paper generator 230 receives the template as input and generates the question paper using the plurality of questions stored in the database 240. In one embodiment of the present disclosure, one of the rule-based method, the greedy method and the GSM method (a combination of Greedy, Simulated annealing and Memetic algorithms) is used for selecting the one or more questions from the database 240, the one or more questions that are matching with the one or more characteristics of the question paper to be generated.

In the rule-based implementation, one or more rules are defined to query the database 240 to return questions matching with the one or more characteristics. Hence, each rule may be in the form of a search query comprising one or more characteristics of the question paper to be generated. For example, a rule may be defined to select one or more questions matching with the one or more characteristics such as average difficulty level, standard deviation of difficulty level, average ideal time, standard deviation of ideal time, chapter wise distribution, and question type. Accordingly, a search query is generated, for example, to select one or more questions matching with the difficulty level "7", average ideal time "2 minutes" and question type "multiple choice question". The question paper generator 230 then maps the search query to the corresponding attributes and values that are tagged to the questions in the database 240, and selects the one or more questions from the database 240 based on the match. Similarly, various combinations of rules may be implemented using the one or more characteristics of the question paper to be generated to select one or more question from the database 240 and hence for generating the question paper. In one implementation, in case any of any rules fails, such as, the rule is insufficient or erroneous or no match found in the database 240, the question paper generator 230 is configured for providing an error message notifying the user of the failure. In such an event, the user may edit the rule to address the failure or the user may manually select the question(s) from the database 240.

In another embodiment of the present disclosure, the question paper generator 230 is implemented with greedy method to avoid the failures mentioned above. In such an implementation, in case of any error or failure, the question paper generator 230 gradually varies the value(s) of the one or more characteristics (value(s) of the one or more attributes) such as difficulty level, ideal time, etc. for selecting at least one question matching with the one or more characteristics of the question paper to be generated. In one embodiment of the present disclosure, the greedy method uses the combination as a univariate distribution of characteristics which allows exponential reduction of search space and high quality may be maintained even when there is content deficiency in the question bank that is database 240.

As described, the question paper may be generated, that is, the questions may be selected from the database 240 using at least one of a rule based method or a greedy method. In another embodiment of the present disclosure, the question paper generator 230 is implemented with the GSM method for generating the question paper. In one implementation, the question paper generator 230 initially selects the question paper generated using at least one of the rule based methods and the greedy method, and then optimizes the selection by using GSM method. In one embodiment of the present disclosure, in GSM method, question paper generator 230 varies (increases or decreases) the value(s) of the one or more characteristics (value(s) of the one or more attributes) in conjunction with a quality score so as to select one or more questions from the database 240 to match the one or more characteristics of the question paper to be generated and hence maintain the quality of question paper. For example, if the average difficulty level of the question paper generated is "7" and the expected average difficulty level was "7.8", the question paper generator 230 uses the GSM method to improve the quality of the question paper generated, that is, to increase the difficulty level of the generated question paper. In this example, GSM method greedily chooses the easier question (question having low difficulty score) from the question paper generated, selects a question having higher difficulty score from the database 240 to improve the average difficulty level, while maintaining the other attributes same. Similarly, in one embodiment of the present disclosure, the GSM method greedily chooses to optimize the ideal time, chapter distribution, question type distribution, based on whichever characteristic has the highest weighted error. In one implementation, the GSM method may be iteratively executed, based on the quality score, to optimize the selection and hence to improve the quality of the question paper.

In one embodiment of the present disclosure, one or more rules are defined to avoid repetition of any question, in comparison with the questions being selected for the previous or earlier question paper(s) generated by the system for the same category, during subsequent question paper generation process. In one example, the one or more rules may be defined to not include the questions that are being selected in past three question paper generation process for the same category.

As described in the present disclosure, the quality scoring module 235 is configured for determining a quality score for question paper generated by the system or for any given question paper. The manner in which the quality score is computed is described in detail further below.

As described, irrespective of the purpose of the question paper (the purpose may be practicing or evaluation) the characteristics of the question paper needs to be similar to the one or more reference question papers in terms of characteristics (template). A quality question paper would therefore be the one having characteristics resembling the characteristics of the one or more reference question papers or the generated template, as closely as possible.

In one embodiment of the present disclosure, the quality scoring module 235 determines a score to each of the one of more characteristics of the generated question paper by comparing the value(s) of each characteristic of the generated question paper with the value(s) of the corresponding characteristic of the template (that is, the characteristics of one or more reference question papers). In other words, the template having the one or more characteristics is set as a reference against which the quality of the question paper generated is measured. In one implementation, the one or more characteristics listed in the "Table 2" are considered for determining the quality of the question paper generated. In one example, the value of the average difficulty level of the generated question paper is computed and compared with the value of the average difficulty level of the template (expected difficulty level), which provides an average difficulty level error (a score for the generated question paper). In another example, Earth Mover's Distance is used to compare the distribution of questions generated and expected distribution, and question type errors are calculated using overlap measures. Further, in another example, question deficiency error may be calculated as the fraction of questions missing to total questions generated by the question paper generator 230. The one or more scores associated with the one or more characteristics determine the quality score of the generated question paper.

As described, the question paper may be generated using one or more of a rule based method, greedy method, GSM method, or any known methods. The question paper generated, by using any method described in the present disclosure, may be presented or made available to the user on their user devices in any known format such as MS word, PDF, any print ready format or in electronic format for online test taking. In one implementation, the generated question paper may be stored in the database 240 and may be used as a reference question paper for generating question papers in future.

As described in the present disclosure, the quality scoring module 235 determines the score to each of the one of more characteristics of the generated question paper by comparing the value(s) of each characteristic of the generated question paper with the value(s) of the corresponding characteristic of the template (that is, the characteristics of one or more reference question papers). Hence, the system 105 disclosed in the present disclosure may be used for measuring the quality of any question paper, for example, manually created question paper. For example, the user may select a category of the question paper (for which the quality is to be measured) and input the question paper to the system 105 using user device 110. Then the system 105 selects one or more reference question papers of the same category, retrieves a value of each of a plurality of attributes associated with each question in one or more reference question papers, and generates a template based on the retrieved values of the plurality of attributes, the template comprising one or more characteristics and associated values, as described in the present disclosure. Further, the system 105 determines one or more characteristics of the question paper for which the quality is to be measured, by retrieving the value(s) of each of a plurality of attributes associated with each question in the question papers. In a preferred embodiment, the values of the attributes of each question of the question paper may be retrieved from the database 240. Alternatively, the user may input the value(s) of the one or more attributes associated with each question of the question papers. Then the quality scoring module 235 assigns a score for the question paper by comparing the value(s) each of the one or more characteristics of the question paper with the corresponding characteristics value(s) of the one or more reference question papers (template). In other words, the template having the one or more characteristics is set as a reference against which the quality of the question paper is measured as described with respect to quality scoring module 235.

As described, the users may measure the quality of any given question paper using the system 105. However, for any user, it may be important to know the effectiveness of the quality score being determined besides the quality score itself. In one embodiment of the present disclosure, the system 105 is configured for determining the effectiveness of the quality score being determined by the quality scoring module 235, and for interpreting the quality score, and the manner in which the same is determined is described in detail further below.

Referring back to FIG. 2, in one embodiment of the present disclosure, the system 105 further comprises, in conjunction with the quality scoring module 235, a quality score validation module 245 configured for determining the effectiveness of the quality score being determined for a generated question paper, and a quality score interpretation module 250 configured for interpreting a quality score being determined for a given question paper. In other words, the quality score interpretation module 250 uses validation data (output of the quality score validation module 245) for interpreting the quality score being determined for the given question paper.

In one implementation, the quality score validation module 245 module determines the effectiveness of the quality score being determined for a question paper using attempts data associated with the question paper and the attempts data associated with the one or more reference question papers. In other words, the quality score validation module 245 compares the attempts data associated with the question paper and the attempts data associated with one or more reference question paper for determining one or more empirical validation parameters, wherein the one or more empirical validation parameters may include but not limited to divergence of marks distribution, rank correlation, etc. The attempts data as described herein refers to data derived from students who attended the question paper, and may include but not limited to marks obtained by the students, activity data of the students, ranks, etc. In one example, distribution of marks obtained by the students for the generated question paper is compared with a distribution of marks obtained by the students for the one or more reference question paper, and KL (Kullback-Leibler) divergence is used as a measure of divergence (one of an empirical validation parameter). In another example, rank correlation (for example, Spearman's rank correlation) between the students who attended both the generated question paper and the one or more reference question papers is used as one of a method for validation. Hence, the quality score validation module 245 determines the consistency of the generated question paper with reference to the one or more reference question paper. In one embodiment of the present disclosure, the process of determination of the effectiveness of a quality score being determined for a question paper is performed/executed periodically, and the correlation between the quality score and the KL divergence, and correlation between the quality score and the rank correlation are recorded in the database 240 for interpreting a quality score being determined for any given question paper.

Figure 4A:
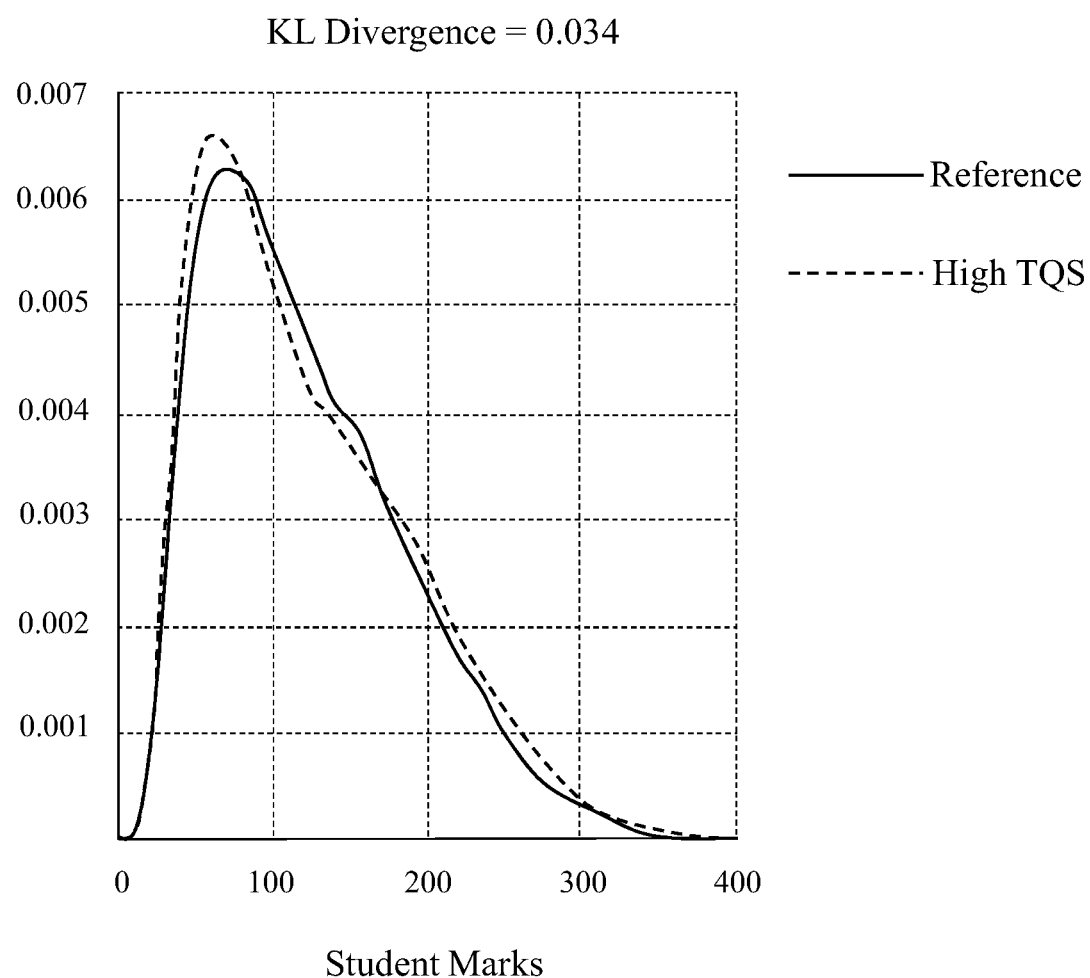
FIGS. 4A, 4B and 4C illustrates correlations between quality score and KL divergence in accordance with an embodiment of the present disclosure.
Figure 4B:
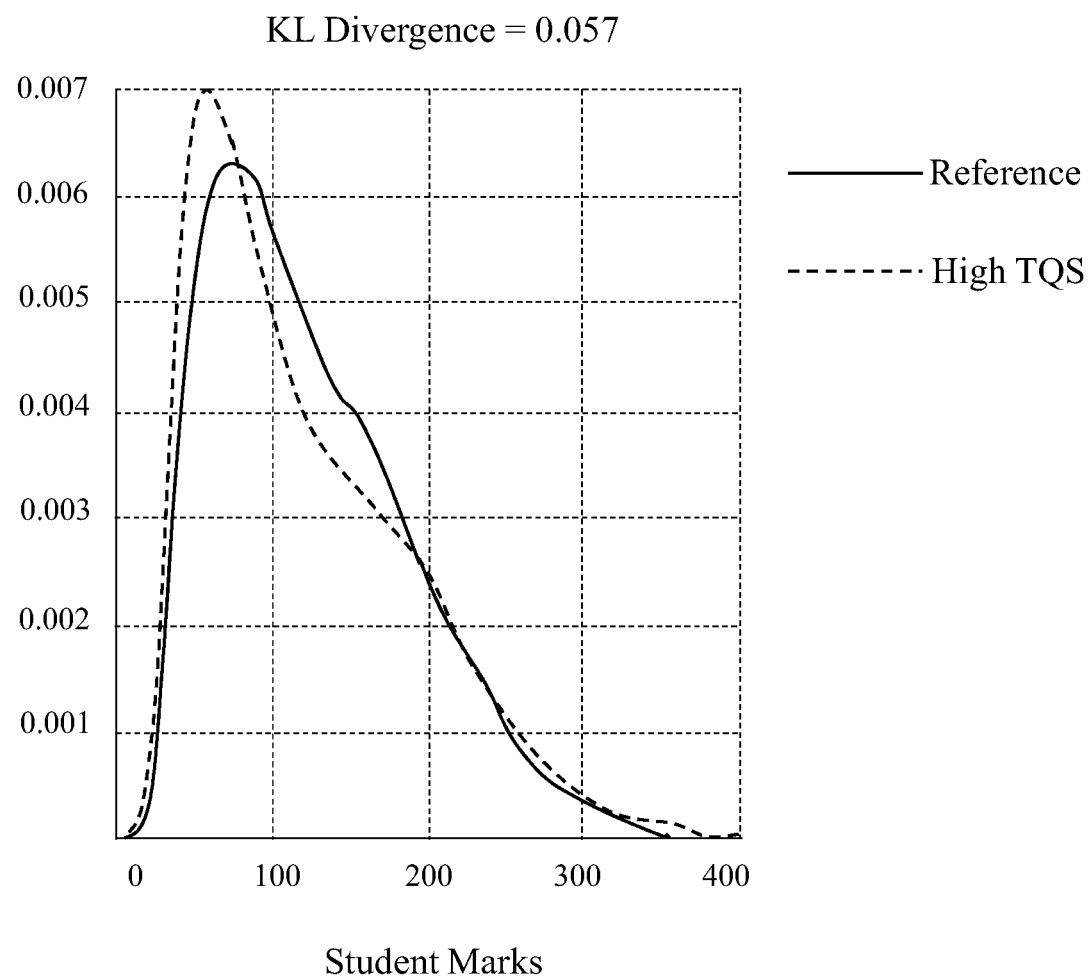
Figure 4C:
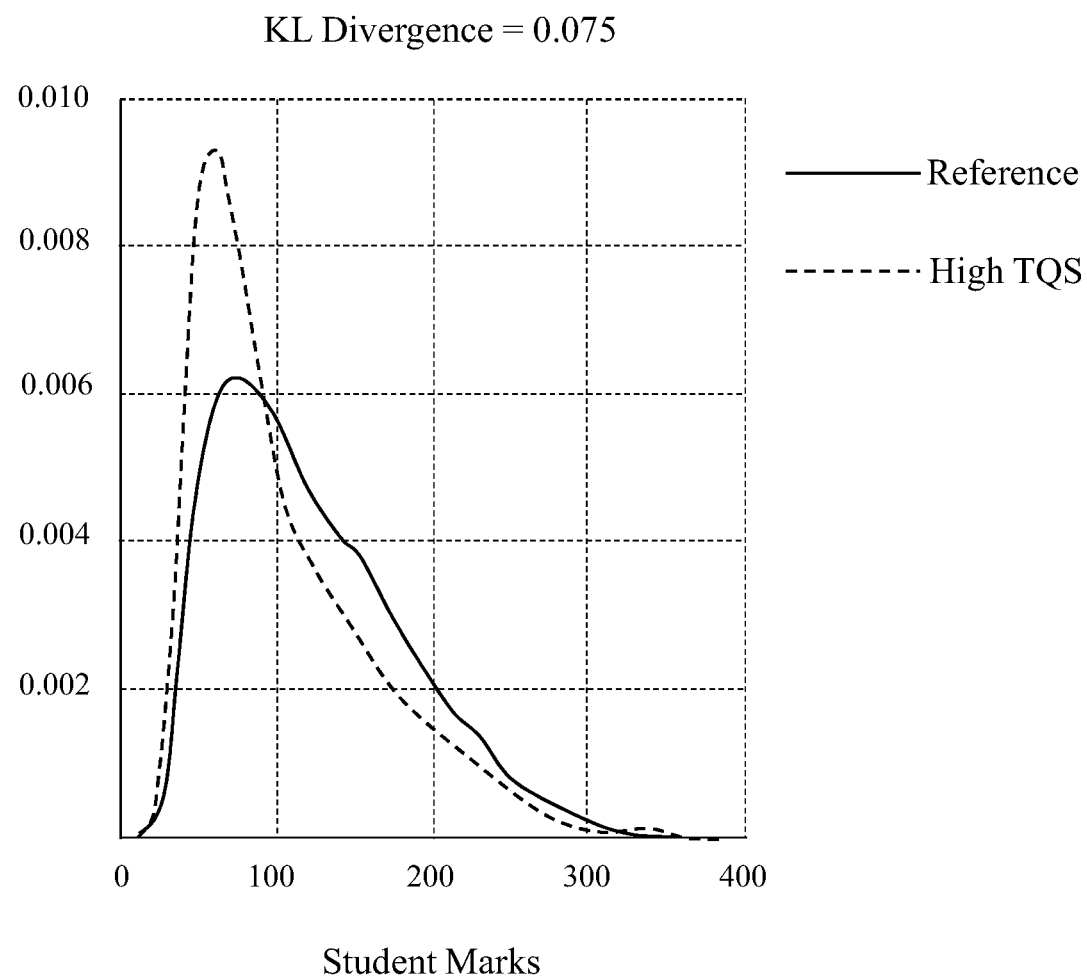

FIGS. 4A, 4B and 4C illustrates correlations between quality score and KL divergence in accordance with an embodiment of the present disclosure. As illustrated, in one example, a question paper with higher quality score should have lower KL divergence and higher rank correlation. Given multiple question papers, relative order of KL divergence and rank correlation should be maintained corresponding to the quality scores. For example, considering a first question paper having a quality score of 95% with a rank correlation of 0.9 and KL divergence of 0.05, and a second question paper having a lower quality score of 90% but a higher rank correlation of 0.95 and lower KL divergence of 0.03, this would imply that the quality scoring module 235 would require iterations. In one embodiment, the quality scoring module 235 would need to arrive at an optimal weighing scheme over one or more characteristics.

As described, the process of determination of the effectiveness of a quality score being determined for a question paper is performed/executed periodically, and the correlation between the quality score, and the KL divergence and the rank correlation are recorded in the database 240. In one embodiment of the present disclosure, the quality score interpretation module 250 uses the validation data, that is, the correlation between the quality score and the KL divergence and the rank correlation for interpreting a quality score being determined for any given question paper or for a generated question paper. In one example, once the system 105 generates a question paper and determines a quality score for the generated question paper, the quality score interpretation module 250 provides the expected KL divergence and expected rank correlation using the validation data. As described, the system disclosed in the present disclosure is configured for (1) generating a question paper by analysing the one or more reference question papers, and (2) determining a quality score for the generated question paper or for any given question paper. Further, the system is configured for (1) validating the quality score being determined for a question paper and (2) interpreting a quality score being determined for a generated question paper.

Figure 5:
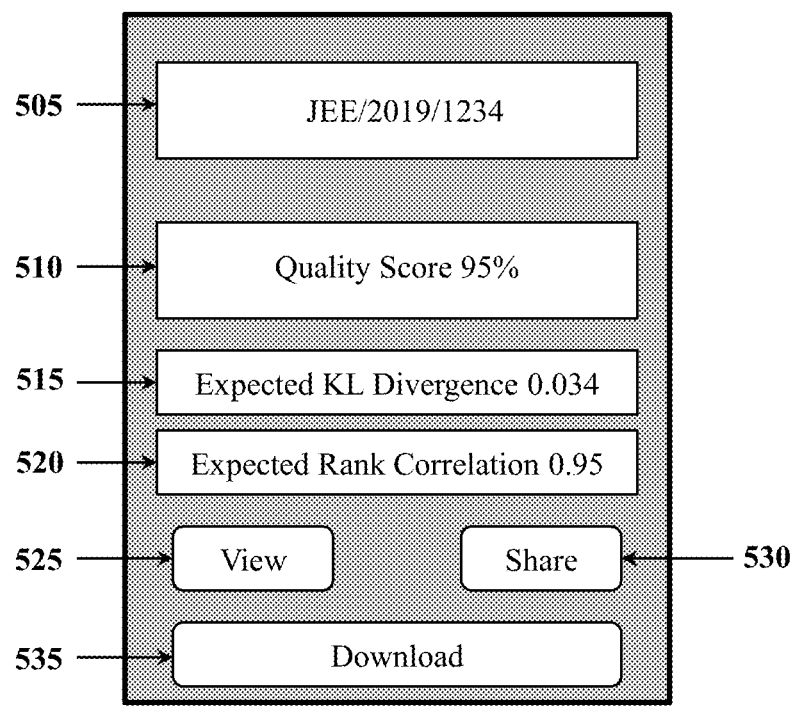
FIG. 5 illustrates an exemplary user interface displaying a result of question paper generation process in accordance with an embodiment of the present disclosure.

FIG. 5 illustrates an exemplary user interface displaying a result of question paper generation process in accordance with an embodiment of the present disclosure. In one implementation, the system 105 provides various details about the question paper being generated on the user device 110 (application or web interface). As shown, details such as reference ID 505 of the question paper being generated indicating the category, year of generation, and serial number, the quality score 510, expected KL divergence 515 of the generated question paper, and expected rank correlation 520 are displayed on the user device 110 associated with the user. Further, system provides various options including but not limited to view 525, share 530 and download 535 for viewing, sharing and downloading the generated question paper 505.

The system and method disclosed in the present disclosure may be used by the students, instructors, institutions, board of education or any person for generating question papers for various purposes such as but not limited to preparation, practice, to determine the proficiency level of the students, to motivate students to study, to measure the students' progress in achieving their goal and to provide feedback to the students, etc. Further, the system may be used for measuring a quality of any given question paper.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible.

We claim:

1. A method for generating a set of learning assessment questions by a learning assessment questions generation system, the method comprising:
   retrieving by an attribute analyser, a value of each of a plurality of attributes associated with each question in reference sets of learning assessment questions;
   determining by a template generator, one or more characteristics and values of the one or more characteristics of each of the reference sets of learning assessment questions based on the values of each attribute associated with each question in the reference sets of learning assessment questions;
   generating by the template generator, a template for the set of learning assessment questions to be generated, the template comprising a set of characteristics and values of each of the characteristics of the set of characteristics for the set of learning assessment questions to be generated, wherein the set of characteristics and the values of each of the characteristics are generated based on the one or more characteristics and values of the one or more characteristics of each of the reference sets of learning assessment questions;
   selecting by the question paper generator, questions from a database of questions, based on the template generated by the template generator, for generating the set of learning assessment questions; and
   presenting the generated set of learning assessment questions to a user device associated with a user.

2. The method as claimed in claim 1, wherein the plurality of attributes associated with each question include one or more of a difficulty level, an ideal time for answering the question, a chapter or subject identifier, a bloom level, a learning slope, one or more lexical features, one or more cognitive features, and a guessing factor.

3. The method as claimed in claim 1, wherein the questions are selected from the database of questions based on the values of each attribute associated with each question in the database of questions and the characteristics and the values of each of the characteristics of the template generated, using one or more of a rule-based method, a greedy method, simulated annealing and memetic method, GSM method or a combination thereof.

4. The method as claimed in claim 1, further comprising:
   retrieving, by the attribute analyser, a value of each of a plurality of attributes associated with each question in the set of learning assessment questions generated;
   determining, by the template generator, one or more characteristics and values of the one or more characteristics of the set of learning assessment questions generated based on the values of each attribute associated with each question in the set of learning assessment questions generated;
   assigning a quality score, by a quality scoring module, for each of the one or more characteristics of the set of learning assessment question generated by comparing the values of the one or more characteristics of the set of learning assessment questions generated with the values the one or more characteristics of set of characteristics in the template; and
   replacing, by the question paper generator, the one or more questions in the set of learning assessment questions generated based on the quality score of the one or more characteristics, for optimizing the quality of the set of learning assessment questions generated.

5. The method as claimed in claim 4, further comprising:
   comparing attempts data associated with the set of learning assessment question generated and attempts data associated with one or more reference sets of learning assessment questions for determining one or more empirical validation parameters of the set of learning assessment question generated, the empirical validation parameters including divergence of marks distribution and rank correlation; and
   recording the quality score associated with the set of learning assessment question generated and the one or more empirical validation parameters of the set of learning assessment question generated, for providing interpretations for a quality score being determined for any given question paper.

6. A system for generating a set of learning assessment questions, the system comprising:
   an attribute analyser configured for retrieving a value of each of a plurality of attributes associated with each question in reference sets of learning assessment questions;
   a template generator configured for:
      determining one or more characteristics and values of the one or more characteristics of each of the reference sets of learning assessment questions based on the values of each attribute associated with each question from the reference sets of learning assessment questions;
      generating a template for the set of learning assessment questions to be generated, the template comprising a set of characteristics and the values of each of the characteristics for the set of learning assessment questions, wherein the set of characteristics and the values of each of the characteristics are generated based on the one or more characteristics and values of the one or more characteristics of each of the reference sets of learning assessment questions;
   a question paper generator for selecting questions from a database of questions based on the template generated by the template generator, for generating the set of learning assessment questions;
   a quality scoring module configured for determining a quality score of the set of learning assessment questions; and
   a user device for presenting the generated set of learning assessment questions and the quality score to the user.

7. The system as claimed in claim 6, the system comprises:
   a quality score validation module configured for measuring effectiveness of a quality score being determined for a question paper; and a quality score interpretation module configured for providing interpretations for a quality score being determined for any given question paper.

\* \* \* \* \*